(12) United States Patent
Koech et al.

(10) Patent No.: US 10,456,739 B2
(45) Date of Patent: Oct. 29, 2019

(54) CAPTURE AND RELEASE OF ACID GASSES USING TUNABLE ORGANIC SOLVENTS WITH BINDING ORGANIC LIQUIDS

(71) Applicant: BATTELLE MEMORIAL INSTITUTE, Richland, WA (US)

(72) Inventors: Phillip K. Koech, Richland, WA (US); Deepika Malhotra, Richland, WA (US); David J. Heldebrant, Richland, WA (US); Vassiliki-Alexandra Glezakou, Richland, WA (US); Roger J. Rousseau, Richland, WA (US); David C. Cantu, Reno, NV (US); Jordan P. Page, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

(21) Appl. No.: 15/976,061

(22) Filed: May 10, 2018

(65) Prior Publication Data
US 2018/0257024 A1    Sep. 13, 2018

Related U.S. Application Data

(63) Continuation-in-part of application No. 15/410,523, filed on Jan. 19, 2017, now Pat. No. 10,130,907.
(Continued)

(51) Int. Cl.
*B01D 53/14* (2006.01)
(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS 3,161,461 A    12/1964  Deal, Jr. et al.
3,725,537 A    4/1973  Schulze et al.
(Continued)

FOREIGN PATENT DOCUMENTS

CA    2539418 A1    9/2007
GB    2079307 A     1/1982
(Continued)

OTHER PUBLICATIONS

Malhotra et al., "Reinventing Design Principles for Developing Low-Viscosity Carbon Dioxide-Binding Organic Liquids for Flue Gas Clean Up." ChemSusChem (2017), 10, 636-642 (published Jan. 11, 2017).*
(Continued)

*Primary Examiner* — Daniel Berns
(74) *Attorney, Agent, or Firm* — Derek H. Maughan

(57) ABSTRACT

A class of water lean, organic solvents that can bind with various acid gasses to form acid gas bound molecules having a high degree of intramolecular hydrogen bonding which enables their use as regenerable solvents for acid gas capture. Unlike the other devices described in the prior art, the present invention takes advantage of shortened distances between the portions of the molecule that form hydrogen bonds within the structures when loaded with an acid gas so as to create a molecule with a higher internal bonding affinity and a reduced proclivity for agglomeration with other molecules.

8 Claims, 8 Drawing Sheets

Related U.S. Application Data

(60) Provisional application No. 62/421,416, filed on Nov. 14, 2016.

(52) U.S. Cl.
CPC .............. *B01D 53/1481* (2013.01); *B01D 2252/20436* (2013.01); *B01D 2252/30* (2013.01); *B01D 2258/0283* (2013.01)

(56) References Cited

U.S. PATENT DOCUMENTS

| | | |
|---|---|---|
| 4,113,849 A | 9/1978 | Atwood |
| 4,137,294 A | 1/1979 | Braizler et al. |
| 4,238,206 A | 12/1980 | Hong |
| 4,545,964 A | 10/1985 | Bergez et al. |
| 4,545,965 A | 10/1985 | Gazzi et al. |
| 4,959,086 A | 9/1990 | Van Baar et al. |
| 5,017,347 A | 5/1991 | Epperly et al. |
| 5,170,727 A | 12/1992 | Nielsen |
| 5,347,003 A | 9/1994 | Trauffer et al. |
| 5,366,709 A | 11/1994 | Peytavy et al. |
| 6,036,931 A | 3/2000 | Yoshida et al. |
| 6,071,484 A | 6/2000 | Dingman, Jr. et al. |
| 7,459,134 B2 | 12/2008 | Cadours et al. |
| 7,718,151 B1 | 5/2010 | Hu |
| 7,799,299 B2 | 9/2010 | Heldebrant et al. |
| 8,652,237 B2 | 2/2014 | Heldebrant et al. |
| 8,691,171 B2 | 4/2014 | Katz et al. |
| 2003/0047309 A1 | 3/2003 | Thomas et al. |
| 2004/0118749 A1 | 6/2004 | Lesemann et al. |
| 2005/0113450 A1 | 5/2005 | Thorarensen et al. |
| 2005/0227959 A1 | 10/2005 | Yoshida et al. |
| 2005/0234044 A1 | 10/2005 | Gronenberg et al. |
| 2006/0004025 A1 | 1/2006 | Brookings et al. |
| 2007/0021382 A1 | 1/2007 | Assaf et al. |
| 2007/0255064 A1 | 11/2007 | Szarvas et al. |
| 2008/0058549 A1 | 3/2008 | Jessop et al. |
| 2008/0112866 A1 | 5/2008 | Davis |
| 2008/0197084 A1 | 8/2008 | Jessop |
| 2009/0136402 A1 | 5/2009 | Heldebrant et al. |
| 2009/0220397 A1 | 9/2009 | Heldebrant et al. |
| 2010/0319540 A1 | 12/2010 | Garcia Andarcia et al. |
| 2012/0063979 A1 | 3/2012 | Kortunov et al. |

FOREIGN PATENT DOCUMENTS

| | | |
|---|---|---|
| JP | 2003261315 A | 6/2003 |
| WO | 1986005474 A1 | 9/1986 |
| WO | 2008068411 A2 | 6/2008 |
| WO | 2008122030 A2 | 10/2008 |
| WO | 2009097317 A2 | 8/2009 |
| WO | 2010039479 A1 | 4/2010 |
| WO | 2012082203 A1 | 6/2012 |

OTHER PUBLICATIONS

Office Action for U.S. Appl. No. 15/410,523, filed Jan. 19, 2017, dated Aug. 8, 2018.

Barzagli, F., et al., A New Class of Single-Component Absorbents for Reversible Carbon Dioxide Capture under Mild Conditions, ChemSusChem, 8, 2015, 184-191.

Barzagli, F., et al., Improved Solvent Formulations for Efficient CO2 Absorption and Low-Temperature Desorption, ChemSusChem, 5, 2012, 1724-1731.

Barzagli, F., et al., Efficient CO2 Absorption and Low Temperature Desorption With Non-Aqueous Solvents Based on 2-Amino-2-Methyl-1-Propanol (AMP, International Journal of Greenhouse Gas Control, 16, 2013, 217-223.

Bates, E. D., et al., CO2 Capture by a Task-Specific Ionic Liquid, J Am Chem Soc, 124, 6, 2002, 926-927.

Blasucci, V., et al., Single Component, Reversible Ionic Liquids for Energy Applications, Fuel, 89, 2010, 1315-1319.

Gurkan, B. E., et al., Equimolar CO2 Absorption by Anion-Functionalized Ionic Liquids, J Am Chem Soc, 132, 2010, 2116-2117.

Halliday, J. D., et al., The Reaction of Trimethylamine in Liquid Hydrogen Sulphide: An Electrical Conductivity Study, AECL, 7999, 1982, 1142-1145.

Heldebrant, D. J., et al, A Reversible Zwitterionic SO2-Binding Organic Liquid, Engery Environ Sci, 3, 2010, 111-113.

Heldebrant, D. J., et al, Reversible Uptake of COS, CS2, and SO2: Ionic Liquids With O-Alkylxanthate O-Alkylthiocarbonyl, and O-Alkylsuffite Anions, Chem Eur J, 15, 2008, 7619-7627.

Heldebrant, D. J., et al., CO2-Binding Organic Liquids (CO2BOLs) for Post-Combustion CO2 Capture, Energy Procedia, 1, 2009, 1187-1195.

Huang, J., et al., Tuning Ionic Liquids for High Gas Solubility and Reversible Gas Sorption, Journal of Molecular Catalysis A: Chemical, 279, 2008, 170-176.

Jou, F-Y., et al., Solubility of Methane in Methyldiethanolamine, J Chem Eng Data, 51, 2006, 1429-1430.

Kidnay, A. J., et al., Fundamentals of Natural Gas Processing, CRC Press Taylor & Francis Group, 2006, 100-113.

Koech, P. K., et al., Chemically Selective Gas Sweetening Without Thermal-Swing Regeneration, Energy Environ Sci, 4, 2011, 1385-1390.

Liu, Y., et al., Switchable Surfactants, Science, 313, 2006, 958-960.

Maddox, R. N., et al., Reactions of Carbon Dioxide and Hydrogen Sulfide With Some Alkanolamines, Ind Eng Chem Res, 26, 1987, 27-31.

McDaniel, D. H., et al., Strong Hydrogen Bonds. III. Hydrogen Sulfide-Hydrosulfide Anion Interactions, Inorganic Chemistry, 5, 12, 1966, 2180-2181.

Phan, L., et al., Switchable Solvents Consisting of Amidine/Alcohol or Guanidine/Alcohol Mixtures, Ind Eng Chem Res, 47, 2008, 539-545.

Siqueira, L. J. A., et al., Shielding of Ionic Interactions by Sulfur Dioxide in an Ionic Liquid, J Phys Chem B, 112, 2008, 6430-6435.

Switzer, J. R., et al., Reversible Ionic Liquid Stabilized Carbamic Acids: A Pathway Toward Enhanced CO2 Capture, Ind Eng Chem Res, 52, 2013, 13159-13163.

Wang, C., et al., Reversible and Robust CO2 Capture by Equimolar Task-Specific Ionic Liquid-Superbase Mixtures, Green Chem, 12, 2010, 870-874.

Wu, W., et al., Desulfurization of Flue Gas: SO2 Absorption by an Ionic Liquid, Agnew Chem Int Ed, 43, 2004, 2415-2417.

Jessop, P. G., et al., Reversible Nonpolar-to-Polar Solvent, Nature, 436, 2005, 1102.

Invitation to Pay Additional Fees and, Where Applicable, Protest Fee for International Application No. PCT/US2009/032208, International Filing Date Jan. 28, 2009, dated Jun. 3, 2009.

Notification of Transmittal of the International Search Report and the Written Opinion of the International Searching Authority, or the Declaration for International Application No. PCT/US2011/041875, International Filing Date Jun. 24, 2011, dated Nov. 28, 2011.

Notification of Transmittal of the International Search Report and the Written Opinion of the International Searching Authority, or the Declaration for International Application No. PCTU/US2011/052602, International Filing Date Sep. 21, 2011, dated Jan. 25, 2012.

English Abstract for Publication No. JP 2003261315, Publication Date Sep. 16, 2003.

The Distillation Group, Inc., Distillation, Jan. 11, 2001, The Distillation Group, Inc. Retrieved from internet Aug. 27, 2013, 5-6.

Office Action for U.S. Appl. No. 15/410,523, filed Jan. 19, 2017, dated Feb. 1, 2018.

* cited by examiner

CAPTURE AND RELEASE OF ACID GASSES USING TUNABLE ORGANIC SOLVENTS WITH BINDING ORGANIC LIQUIDS

PRIORITY

This invention claims priority from and is a Continuation in Part of U.S. patent application Ser. No. 15/410,523 entitled Capture And Release Of Acid Gasses Using Tunable Organic Solvents With Aminopyridine filed Jan. 19, 2017, which claims priority from provisional patent application No. 62/281,053 entitled System and Process for Tunable Organic Solvents for Selective Capture of $CO_2$ filed Jan. 20, 2016, and from provisional patent application No. 62/421,416 entitled Capture and Release of Acid Gasses Using Tunable Organic Solvents with Aminopyridine filed Nov. 14, 2016, the contents of all which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

Field of the Invention

The invention generally relates to acid gas capture and more particularly to reversible acid gas capture systems and processes.

Background Information

The release of greenhouse and acid gases into the air produces local and global effects on the environment. The combustion of fossil fuels generates acid gases such as carbon dioxide ($CO_2$), sulfur oxides ($SO_2$ and COS), sulfides ($H_2S$) and nitrogen oxides (NOx). Fixed combustion sources, such as coal burning power plants, generate significant acid gas emissions released in their flue gas. The capture and removal of the acid gases including carbon dioxide ($CO_2$), sulfur oxides ($SO_2$, $SO_3$, COS, $CS_2$), hydrogen sulfide ($H_2S$), and nitrogen oxides (NOx) from flue gas will become an even greater issue as coal becomes more prominent in the world's future energy consumption. The capture of significant amounts of greenhouse and acid gases from emission sources is desired to reduce the environmental effects of these sources.

Current aqueous flue gas scrubbing technologies are typically too energy intensive to be used industrially or often require the use of toxic materials which further complicates implementation. Various current aqueous scrubbing technologies remove sulfur oxides and nitrogen oxides from flue gas, and trap these acid gases as basic salts of their acid gases (thiocarbonates, dithiocarbonates, sulfites and nitrate) using a highly basic solution of caustic soda or lime. In these examples the binding is stoichiometric and irreversible and results in a base that cannot be reused.

Various binding organic liquid (BOLs) acid gas capture strategies such as those developed by Phillip Jessop, David Heldebrant, Phillip Koech and others are described in various applications and patents such as U.S. Pat. No. 7,700,299. These technologies are a significant improvement over the prior art and have shown great promise in providing a solution to these problems. However, in some circumstances, these binding organic liquids can be limited by problems related to an increase in viscosity with $CO_2$ loading which impacts the ability of these materials to be pumped and transferred from one location to another, and has created various problems related to their scaling up and broader utilization. What is needed is a form of binding organic liquid that remains in a less viscous state when bound with the acid gas so as to allow pumping and transportation of the liquid sorbents from one location to another. What is also needed is a process for tuning binding organic liquids so as to retain a desired low viscosity or other features. What is also needed is a form of a binding organic liquid that retains a desired level of viscosity and also allows for facile release of acid gasses and regeneration of the sorbent material. The present invention meets these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present disclosure provides a description of a gas-selective capture sorbent for capture and chemical binding of an acid gas, comprising 1-BEIPADIP-2-BOL that reversibly binds an acid gas under a first set of conditions and releases said acid gas under a second set of conditions. In one example the 1-BEIPADIP-2-BOL has the structure:

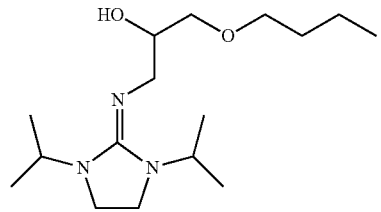 [SMILES: CCCCOCC(O)CN=C1N(C(C)C)CCN1C(C)C]

In some examples this capture solvent retains a viscosity at or below about 300 cP at a maximum loading of acid gas therein.

In some instances a method for capturing an acid gas from a stream containing that acid gas is described wherein the method includes the step of contacting the stream with a gas selective capture sorbent comprising a 1-BEIPADIP-2-BOL that reversibly binds an acid gas under a first set of conditions and releases said acid gas under a second set of conditions, whereby the acid gas binds to the gas selective capture sorbent to form a bound solvent. In some instances this method may include the step of moving the bound solvent to another location and exposing said bound sorbent to a second set of conditions whereby the acid gas is released and the sorbent is regenerated. In some instances the sorbent is a liquid. In some instances the acid gas is selected from $CO_2$, $SO_2$, COS, $CS_2$, $H_2S$, and combinations thereof. The step of exposing the bound sorbent to a second set of conditions may include heating said sorbent to a temperature between from 100° C. to 130° C.

In some instances the second set of conditions includes heating a bound sorbent in the presence of an antisolvent in the liquid phase to a temperature between from 70° C. to 100° C. This antisolvent may be a non-volatile, chemically inert liquid with low polarity. The method may also include the step of exposing the acid gas bound sorbent to a second set of conditions includes shifting polarity of the sorbent from zwitterionic alkylcarbonate form to the alkylcarbonic acid form.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

Figure 1:
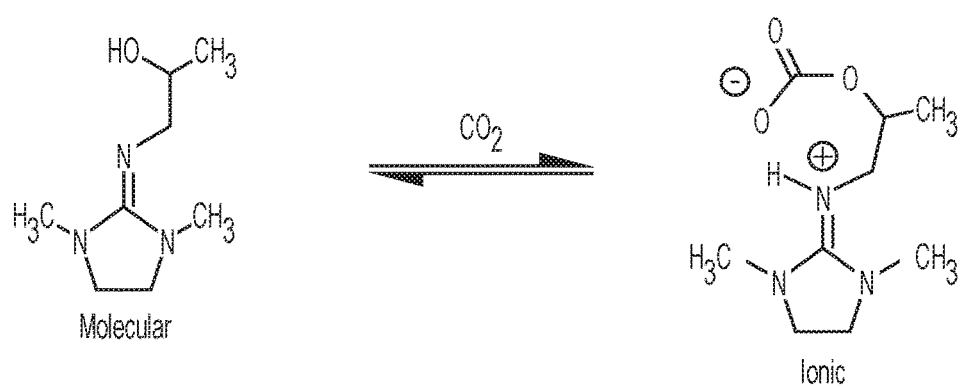
FIG. 1 shows an example of one exemplary embodiment of the invention.
Figure 2:
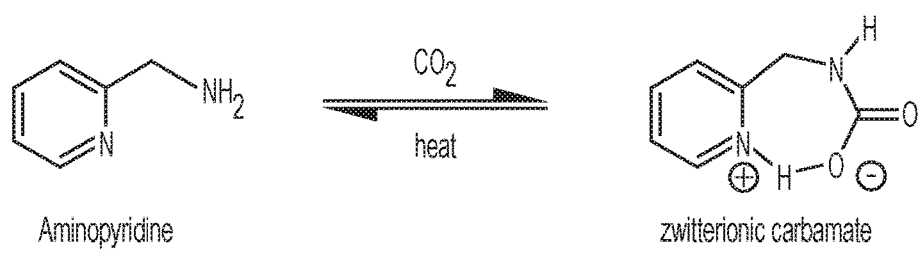
FIG. 2 shows an example of another embodiment of the invention
Figure 3A:
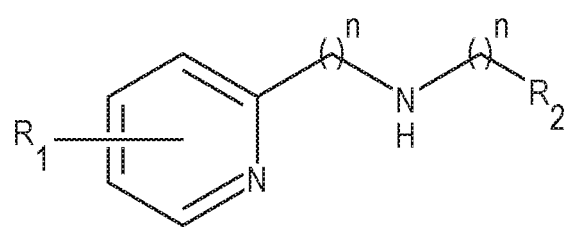
FIGS. 3A and 3B show the structures of various other embodiments of the invention.
Figure 3B:
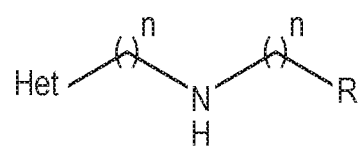
Figure 4:
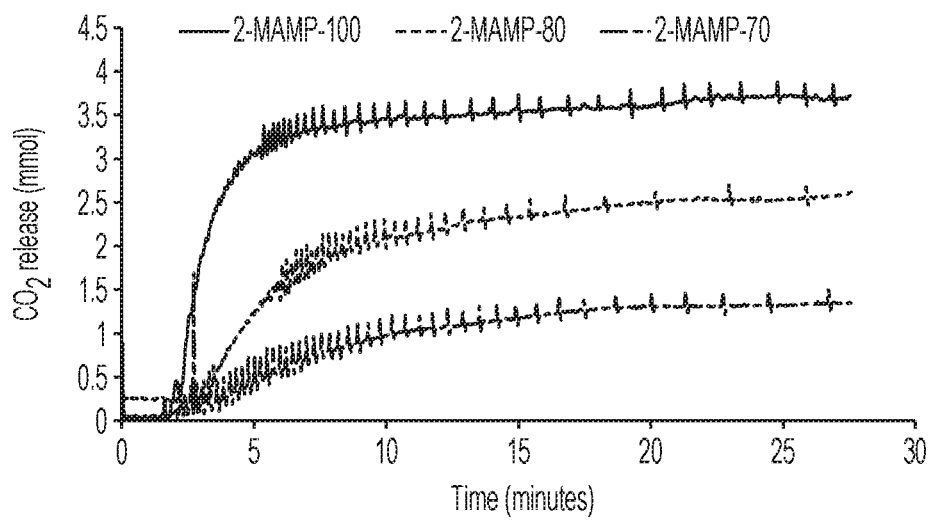
FIGS. 4 and 5 show the rates of $CO_2$ release and sorbent regeneration in various examples of the invention
Figure 5:
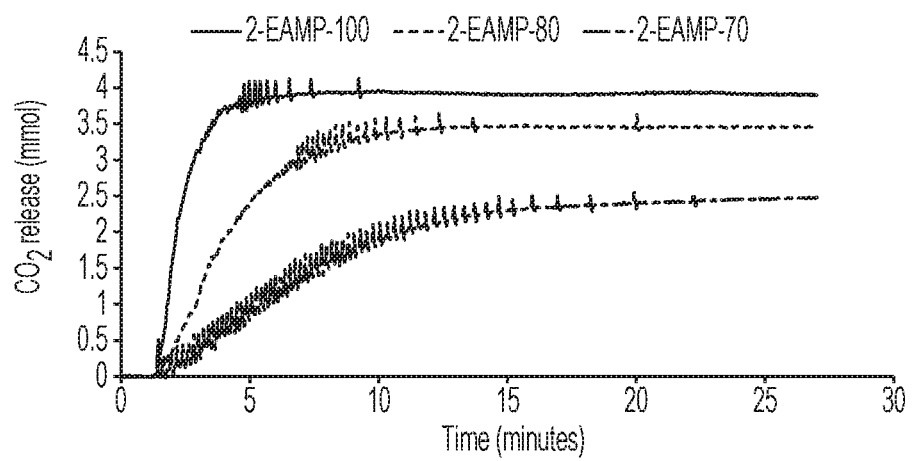
Figure 6:
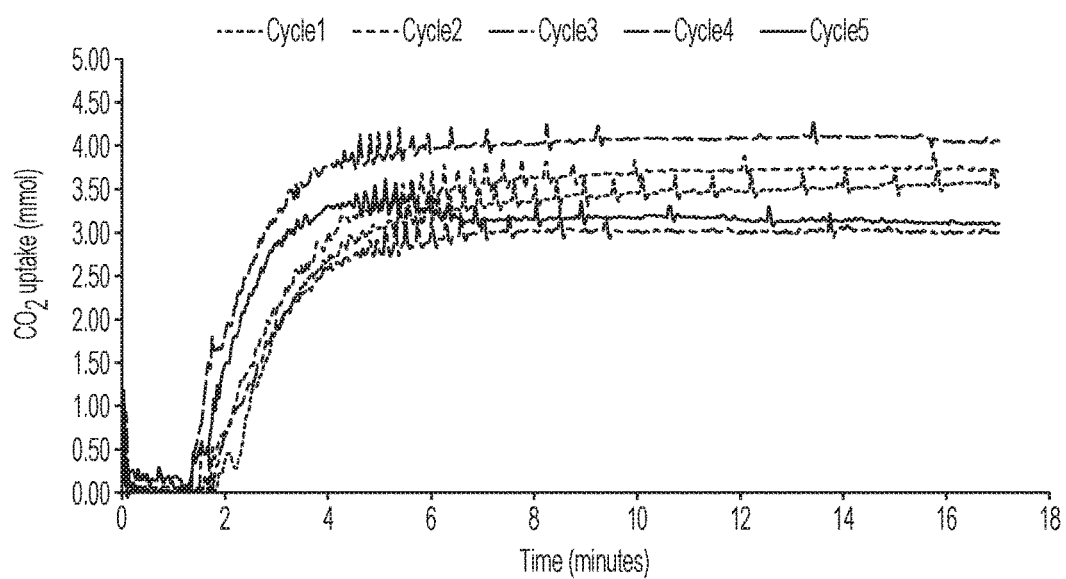
FIG. 6 shows the recyclability of one example of the present invention over several load and unload cycles.

The following description includes various embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

The present detailed description includes various modified $CO_2$ binding organic liquids ($CO_2BOLs$) and various designs for tuning such materials to effectuate acid gas capture while imparting desired characteristics such as lowered levels of viscosity to the resulting bound materials. While these embodiments are shown and described in the context of $CO_2$, it is to be understood that the invention is not limited thereto but includes other acid gasses as well. In one set of embodiments, water-lean non-aqueous binding organic liquids solvents that form zwitterionic alkylcarbonates for acid gas capture are described.

In one typical application and usage, the present invention includes a series of water lean or non-aqueous sorbents that are able to bind acid gasses such as $CO_2$, $SO_2$, COS, $CS_2$, etc. at standard temperature and pressures (STP) to form liquid carbamate salts with a generally high gravimetric capacity but retain a desired level of viscosity. As such the bound sorbents may be pumped or transferred from one location to another which enables the acid gas in one location to be captured under a first set of process conditions and then moved to another location where the acid gas can be removed by subjecting the bound material to a second set of conditions and ideally the sorbent regenerated for later use. Stripping of these acid gasses and regeneration of the underlying sorbent can take place when conditions, such as temperature, pressure or other stimuli are altered. This enables a cyclical process to take place wherein acid gasses are captured, bound, and then subsequently released with these binding materials recycled for reuse.

The solvents described in the present application have relatively low thermal regeneration temperatures (a little over 100 degrees C. without pressure swing absorption and a little under 100 degrees C. with pressure swing absorption and low $CO_2$-rich solvent viscosity compared to other water-lean materials. The regeneration temperature can be lowered further to ~80° C. by applying polarity swing assisted regeneration (PSAR) making it feasible to utilize lower grade heat from the power plant for acid gas stripping resulting in energy savings. While others have utilized aqueous acid gas capture technologies made up of primary and secondary alkanol amines such as monoethanolamine (MEA) or diethanolamine (DEA) in water for chemical absorption of acid gas capture materials like $CO_2$, high regeneration temperatures (>120° C.), high steel corrosion due to the water load, and thermal degradation render these types of materials undesirable. In addition, most of these other solvents when amine-based require a co-solvent such as water or an added organic to dissolve the carbamate salt. The presence of a co-solvent also negates the ability to perform a PSAR, thus all embodiments herein are concentrated amines that have no added water, but will accumulate water during use, wherein operation occurs with a steady-state water load of less than (but not limited to) 10 wt %. The present embodiments which are alkanol guanidine based operate in much less harsh (milder) conditions and do not require a co-solvent to dissolve the $CO_2$ carrier to enable processing.

In one set of embodiments principles and methods for the tunability of acid gas capture binding organic liquids for acid gas capture such as $CO_2$ binding in $CO_2BOLs$ are described. A series of discoveries made at Pacific Northwest National Laboratory in Richland, Wash. USA by Vassiliki-Alexandra Glezakou, Roger Rousseau, and others have shown that single component $CO_2$-rich $CO_2BOLs$ do not exist entirely as zwitterionic species but rather in a dynamic equilibrium between alkyl carbonic acid (the acid form [A]) and the zwitterion form [Z]. Tests performed on that zwitterion form revealed that various aspects of acid gas capture (and $CO_2$ capture specifically) by water-lean solvent systems can be controlled by deliberate molecular modifications. Specifically, it was found that close proximity of amine and alcohol moieties and tunable acid/base equilibria play important roles in determining $CO_2$ adsorption kinetics and bulk liquid viscosity.

The close proximity of the guanidine and alcohol moieties facilitates the concerted mechanism of $CO_2$ binding by the nucleophilic alcohol and concurrent proton transfer to the guanidine. The overall effect is fast $CO_2$ binding kinetics associated with low entropic contribution to the free energy barrier. This proximity also enables stronger internal H-bonding that favorably reduces viscosity. A high acidity at the alcohol site allows for a more efficient $CO_2$ activation at the transition state and an efficient proton transfer to the imine nitrogen on the guanidine moiety. In some embodiments non-charged $CO_2$ capture solvent systems obtained by adjusting the acid/base properties of the solvent molecules, so that a significant fraction of the $CO_2$-loaded molecules can exist in a partial or non-charged (acid) form may be preferable. This adjustment can be achieved by either increasing the acidity of the alcohol or by decreasing the basicity of the guanidine. Experiments have shown that non-charged $CO_2$ capture systems exhibit appreciably lower viscosities than the analogous zwitterionic form due to decreased number (or lower degree of) ionic interactions. The guidelines outlined here for controlling $CO_2$ uptake kinetics and viscosity reduction can be ubiquitously applied to both alkylcarbonate and carbamate solvent systems.

This proximity also enables stronger internal H-bonding that favorably affects viscosity and assists in enabling acid gas bound moieties to be pumped from one location to another with less energy requirements. In one set of experiments the presence of a high acidity at the alcohol site allows for a more efficient $CO_2$ activation at the transition state and an efficient proton transfer to the imine nitrogen on the guanidine moiety. This then leads to the concept that by adjusting the acid/base properties of the solvent molecules so as to obtain a charge neutral molecule rather than an ionic molecule as the art currently describes, that $CO_2$ capture systems that exhibit appreciably lower viscosities than the analogous zwitterionic forms could be designed.

Referring first to FIG. 1, an example of one exemplary embodiment of the invention is shown. FIG. 1 shows the methodology for the capture of an acid gas, in this case $CO_2$ by a binding organic liquid. From experiments it has been shown that the acid gas binding free energy is one of the deciding criteria in the design of gas separation solvents. In this particular instance, the binding organic liquid has been designed with bond angles between the alcohol and guanidine moieties that allow for a closer hydrogen bonding proximity between the positive (guanidinium) portion of the capture molecule and the negative (alkylcarbonate, bound $CO_2$) portion which results in reducing the charges on the zwitterion moving the molecule toward a charge neutral arrangement and a resulting desired lower viscosity because the individual molecules are structured in such a way so as to reduce agglomeration of $CO_2$-bound molecules. These lower viscosities in turn enable higher process efficiency by being able to operate at higher $CO_2$ loadings, use lower pumping power, and have faster $CO_2$ absorption than viscous derivatives.

A series of simulations on various capture molecules (in this case $CO_2$BOLs) including 1-IPADM-2-BOL, IPADM-3-BOL, IPATBM-2-BOL, and PADM-2-BOL showed that solvated $CO_2$ in the vicinity of the alcohol where the radial rC-O distances were less than 2.00 Å binds $CO_2$ in the form of an alkylcarbonate, while the H atom that originally belonged to the OH group remains on the guanidine N. For radial distances greater than 2.20 Å, 1-IPADM-2-BOL remains in its alcohol form, and $CO_2$ is mostly linear with the $\angle OCO$ angle averaging ~175°. The angle decreases to ~165° for rC-O distances between 2.0 and 2.2 Å. $CO_2$ binding happens in an effectively concerted mechanism: at rC-O~2.00 Å, the $\angle OCO$ angle decreases to ~165° for rC-O distances between 2.0 and 2.2 Å. $CO_2$ binding happens in an effectively concerted mechanism: at rC-O distances of ~2.00 Å, the $\angle OCO$ angle becomes ~150° with a simultaneous H transfer to the nitrogen of the guanidine base. The $CO_2$ structure is consistent with a partial charge transfer to form a $CO_2$ ($\delta$-) moiety and subsequent formation of a $CO_3$- moiety in the 1-IPADM-2-BOL. This stronger hydrogen bonding, coupled with charge neutrality, contributes to a reduction in agglomeration in the acid gas-rich environment. This reduction in agglomeration in turn results in overall reduced viscosity in the system. In other embodiments, viscosity is adjusted based upon monitoring the free energy profile (i.e., $\Delta G$ ([A]–[Z]) kJ/mol) and tuning the acid-base equilibria ($K_{eq}$=[A]/[Z]) between the solvated and bound $CO_2$ states.

The free energy profile for binding $CO_2$ to 1-IPADM-2-BOL proceeds with a barrier of 16.5±1.2 kJ/mol and a binding free energy of −5.8±1.6 kJ/mol. The binding free energy is consistent with the experimentally obtained values for diazabicyclo[5.4.0]-undec-7-ene (DBU) containing dual-component $CO_2$BOLs that range between −5.7 to −9.7 kJ/mol. This implies that at 40° C., there is an equilibrium between solvated and bound $CO_2$. The free energy barrier of 16.5 kJ/mol and the activation energy of 9.8 kJ/mol are compatible with the experimental observation that this process readily occurs at 40° C.

For aqueous monoethanolamine (MEA) capture liquids, the energy barrier is more than twice that of $CO_2$BOLs: density functional methods give a barrier of 35.5 kJ/mol for dry MEA, and from 16 kJ/mol up to ~63 kJ/mol for wet MEA; activation free energy estimates with the Arrhenius relation from experimental data are ~46.7 kJ/mol. An estimate of activation free energy is only ~7 kJ/mol higher than the activation energy, which is indicative of a small entropic contribution at the transition state, owing to the proximity of the acid/base moieties in the single component systems: unlike dual component systems, solvent re-organization at the transition state is not required. The relatively low barrier then suggests that capture in $CO_2$BOLs is diffusion limited, which matches experimental observations. Because the solvent viscosity increases exponentially with $CO_2$ loading, the capture rate will decrease as more $CO_2$ is added. These phenomena were observed when the $CO_2$ absorption rates of single and dual-component $CO_2$BOL solvents where measured with wetted-wall experiments. These findings and understandings enable the design of liquid carbonates that will have increased $CO_2$ uptake capability, and enable the design of carbamate salts with decreased viscosities. By tuning the proximity of the alcohol and the amine so as to create structures that when bound to an acid gas have a preference for their own internal hydrogen bonding rather than agglomeration with other structures and creating molecules that are preferentially more charge neutral than ionic, the problems of high viscosity in an acid gas-rich state as exists in other embodiments is reduced.

Inspired by these findings, single component alkanolguanidines with various pendant coordinating chemical moieties were designed to create structures having a high degree of internal hydrogen bonding and/or acid-base equilibria favoring the non-charged acid state (e.g., [1:1] acid [A]: zwitterion [Z] ratio) upon capture and binding of the acid gas in the bound material.

In one set of embodiments, modified $CO_2$ binding organic liquids with structures favoring internal hydrogen bonded species in the bound material were utilized that gave resulting viscosities that were reduced compared to those forming primarily zwitterionic species. For example a modified 1-IP- ADM-2-BOL was created that formed 34% internal (neutral charged) hydrogen bonded species and 66% external hydrogen bonded species that gave a resulting viscosity of ~110 (cP) at a $CO_2$ loading of 25 wt %.

In another set of embodiments, five modified $CO_2$BOLs (1-MEIPADIP-2-BOL, 1-IPADM-2-BOL, 1-IPADM-3-BOL, 1-IPATBM-2-BOL, PADM-2-BOL) were utilized. Table 1 lists fractions of internal hydrogen bonded species formed in these sorbent liquids at a $CO_2$ loading of 25 wt %.

TABLE 1

| $CO_2$ Binding Organic Liquid | Internal H-Bonded Species ($P_{int}$) | Viscosity (MD Simulation) (cP) | Viscosity (Experimental) (cP) |
| --- | --- | --- | --- |
| 1-MEIPADIP-2-BOL | 52% | 114 | 75 |
| 1-IPADM-2-BOL | 34% | 149 | 171 |
| 1-IPADM-3-BOL | 21% | 190 | 270 |
| 1-IPATBM-2-BOL | 2% | 499 | Very viscous |
| 1-PADM-2-BOL | <1% | 950 | Solid |
| 1-MEIPADIP-2-BOL | >90% | 11 | 16 |

As these data show, selecting or modifying structures of the sorbent liquid and/or tuning acid-base equilibria to obtain an increasing number of internal hydrogen-bonded species in the bound material reduces viscosity of these $CO_2$ binding organic liquids.

In another set of experiments, various $CO_2$ binding organic liquids were modified and tuned. The acid-base equilibria between the (solvated) organic acid and the conjugate base (i.e., bound $CO_2$ state) in the capture liquid were adjusted, decreasing the free energy profile, and increasing the number of charge neutral species that resulted in decreasing the viscosity in the resulting $CO_2$-bound material.

In one example, modified $CO_2$ binding organic liquids were created with reduced acidity of the pendant R-group of the coordinating base. A 1-IPADM-2-BOL was modified by attaching an oxime moiety to the alcohol group of the coordinating base, reducing the free energy from 21.6 kJ/mol to −3.1 kJ/mol and tuning the acid-base equilibrium yielding a ratio of neutral-to-charged species (acid [A]: zwitterion [Z]) in the capture liquid from 1/4000 to 3/1 in the bound material. This resulted in lower viscosity and improved capture capacity.

In another set of embodiments, modified $CO_2$ binding organic liquids were utilized with structures modified to reduce basicity of the pyridine core, for example, by attaching acidic or electronegative moieties to the core structure. A 1-IPADM-2-BOL)1-isopropyl dimethyl binding organic liquid was modified by attaching fluorine to the guanidine core reducing the free energy in the capture liquid from 21.6 kJ/mol to −5.4 kJ/mol and tuning the acid-base equilibrium yielding a ratio of neutral-to-charged species in the capture liquid from 1/4000 to 8/1 in the bound material, resulting in lower viscosity and improved capture capacity.

In another set of experiments a new derivative 1-BEIPA-DIP-BOL (1 butylether isopropyl-di-isopropyl-2-binding organic liquid proved to be an attractive target for viscosity reduction.

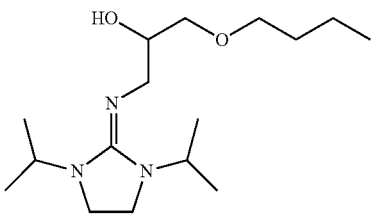

This new derivative has keeps the same thermodynamic binding strength which relates to selectivity for $CO_2$ to be captured. The derivative also has the same kinetics of capture, indicating that the previous models that we developed for a workable and efficient process could be used to model the behavior of this derivative. This material provides an additional advantage in that operates without the viscosity increase typically seen in other binding organic liquid materials. By removing the viscosity increase near theoretical performance resulted. Previously, nobody has been able to design from the molecular-level a revised solvent that is non-viscous while retaining all other performance metrics. Normally, when one property is changed, all others are also changed.

This new material demonstrates the ability to retain the $CO_2$ capture function of the other materials without their attendant increases in velocity. This new derivative could be among the most efficient solvents for post-combustion $CO_2$ capture on the market. The system has a higher efficiency than 1st and 2nd generation aqueous amines, with potential to be refined and improved with continued R&D. This derivative and structurally similar analogues have thermodynamic efficiencies above 50%; higher than that of the most advanced water-based solvents. This is primarily due to the reboiler (the regenerator) heat rates being as low as ~2.0 gigajoules per tonne of $CO_2$, which is roughly 10-15% lower than the most advanced aqueous formulations. Further, the ability to use a PSAR to regenerate the solvent enables the power plant to use lower quality heat, allowing the power plant to make more power compared to using aqueous solvent technologies. Presently, the current understood benefits of the system include 40% lower reboiler (regenerator) heat duty, 4% higher net coal-fired power plant efficiency (more power to sell) potential to meet DOE's $40/tonne cost metric (allowing $CO_2$ to be cheap enough to for use such as enhanced oil recovery (EOR) or for permanent sequestering).

Figure 7:
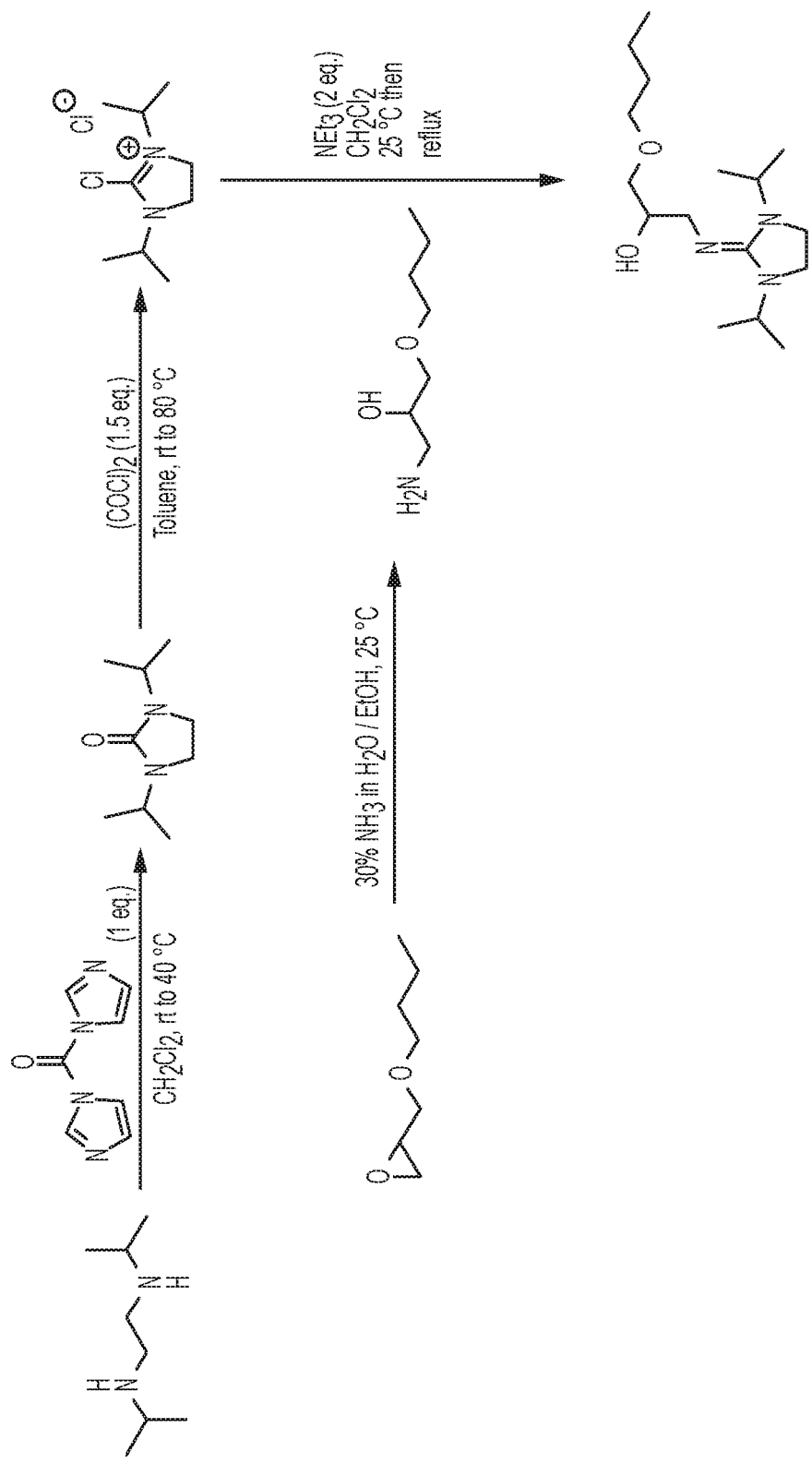
FIG. 7 shows a drawing of an exemplary synthesis of one embodiment of the invention.

In one set of experiments 1-BEIPADIP-2-BOL was synthesized in 14% overall yield in a three-step linear sequence. We began from 1,3-diisopropylethylene diamine reacting with the phosgene equivalent 1,1-carbonyldiimidazole to generate the urea, that was then transformed into the key Vilsmeier salt upon reaction with oxalyl chloride. The amino alcohol was synthesized by following a known pathway for large scale by reacting n-butyl glycidyl ether with ammonia in water. Finally, the product was completed by condensing the amino alcohol with the Vilsmeier salt and distilled at reduced pressure to get our pure, lean solvent. A drawing of this synthesis is shown in FIG. 7. Once formulated a variety of tests and experiments were performed.

Figure 8:
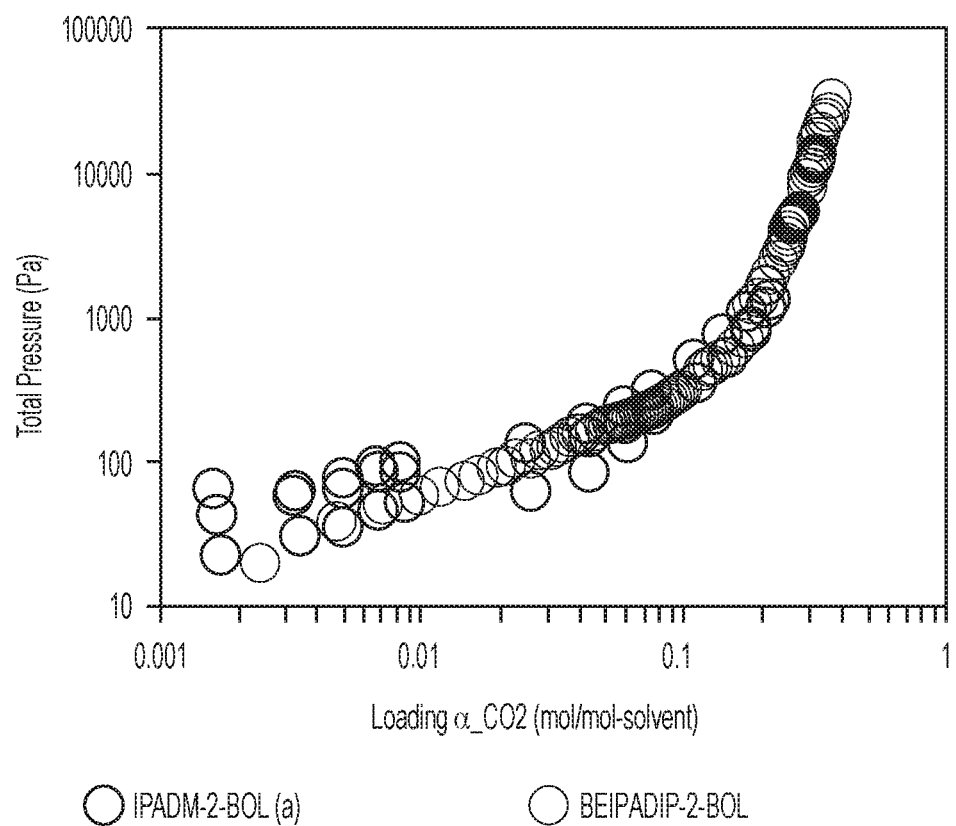
FIG. 8 shows a comparison of $CO_2$ loading curves of two exemplary embodiments as related to pressure.

The vapor-liquid equilibrium (VLE) behavior of 1-BEIPADIP-2-BOL was measured using a custom-built PVT cell. Anhydrous isotherms were measured at 40, 60 and 70° C. 1-BEIPADIP-2-BOL showed typical chemical absorption profiles similar to previous $CO_2$BOL derivatives and other water-lean solvents. The P* values for 1-BEIPADIP-2-BOL were comparable to those of 1-IPADM-2-BOL indicating that the reduction in viscosity was achieved without negatively impacting the equilibrium loading of $CO_2BOL$ solvents. The similarity in P* suggest that this new derivative would have the capacity and selectivity to meet DOE's metric for post-combustion $CO_2$ capture as does 1-IPADM-2-BOL. FIG. 8 shows an isotherm for 1-BEIPADIP-2-BOL and 1-IPADM-2-BOL as a function of $CO_2$ loading.

Figure 9:
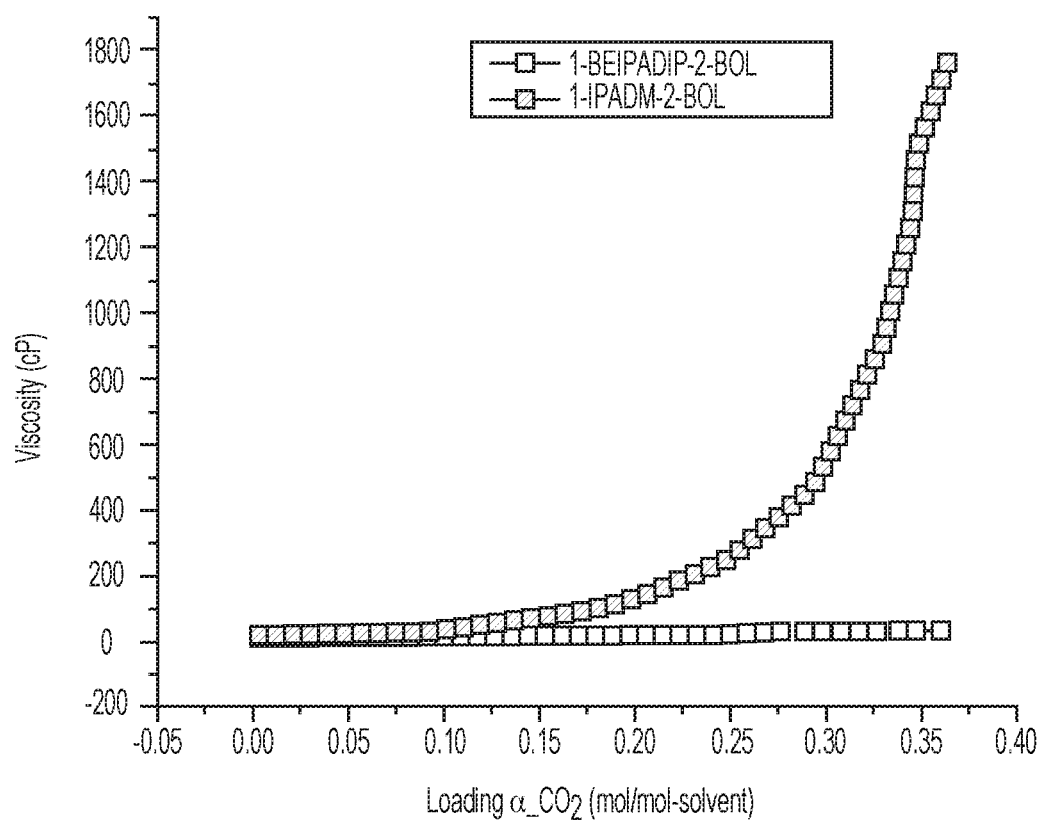
FIG. 9 shows a viscosity curve of $CO_2$ loaded material in two exemplary embodiments.
Figure 10:
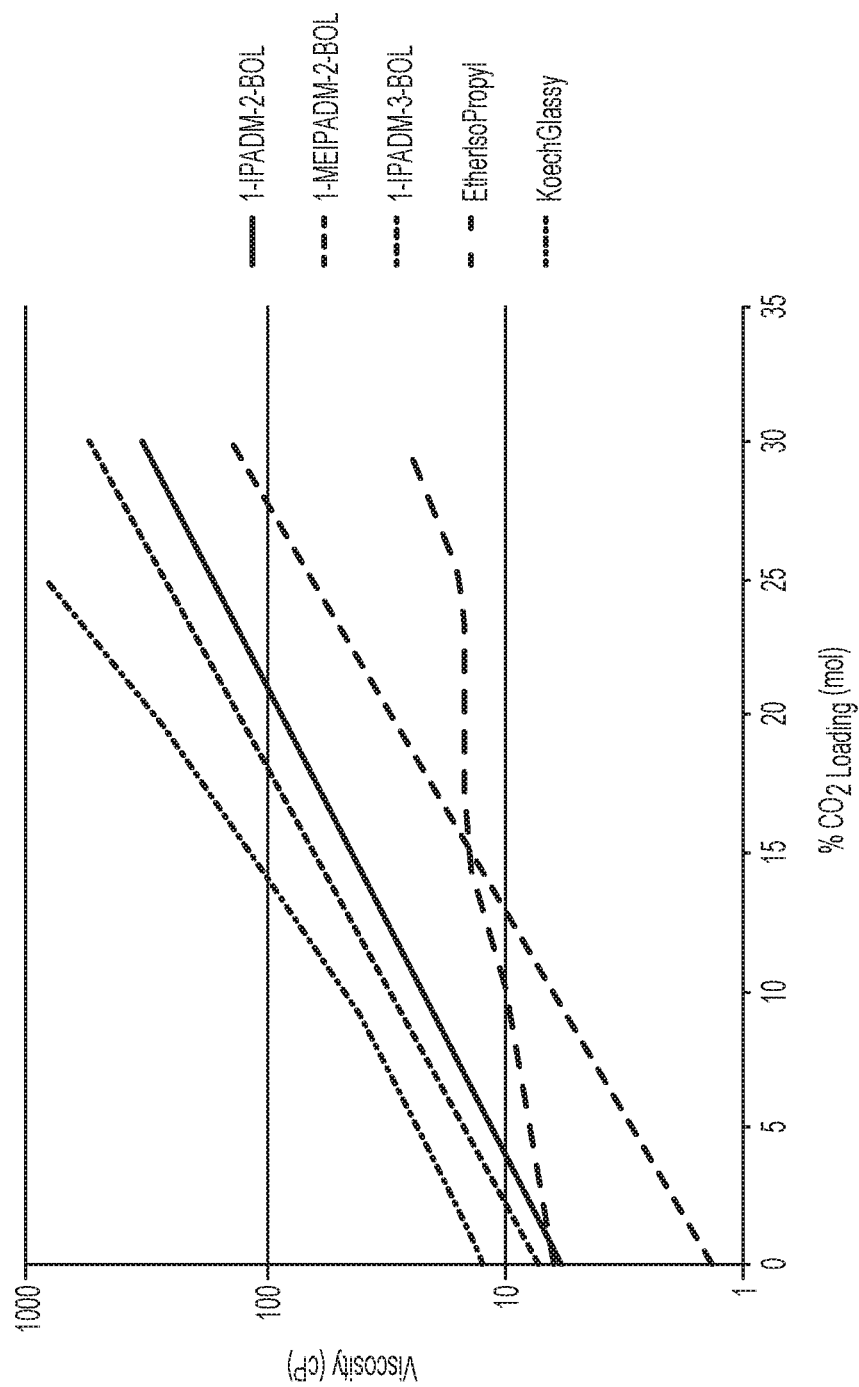
FIG. 10 shows the viscosity of various exemplary materials at various percentages of $CO_2$ loading.

Like other water-lean solvents, 1-BEIPADIP-2-BOL shows a non-linear increase in viscosity with $CO_2$ loading, though the degree of non-linearity is not as severe (FIG. 9). Viscosity profiles were measured for the three VLE isotherms at 40° C., 60° C. and 70° C., showing that this derivative never exceeds 40 cP under expected operating conditions. 1-BEIPADIP-2-BOL was measured to have a rich solvent (0.5 mol $CO_2$/mol) viscosity of 36 cP at 40° C., which is >98% lower than that of 1-IPADM-2-BOL (>3,000 $cP)^{REFs}$ at comparable conditions. The presence of water did not cause any adverse effects on absorption performance. We had previously modeled that a 4-5 wt % steady-state water load would be thermodynamically optimal water carry through for 1-IPADM-2-BOL in a working process.

To confirm water tolerance, 4 wt % deionized water was added to 1-BEIPADIP-2-BOL in the PVT cell and the viscosity measured as a function of $CO_2$ loading. The measurements showed a negligible increase in viscosity compared to the anhydrous measurements indicating minimal impact of water on viscosity or $CO_2$ uptake. Visual inspections during the measurements confirmed no signs of phase separation or precipitation of bicarbonate salts confirming a high degree of water tolerance. This is not surprising as 1-IPADM-2-BOL showed a high degree of water tolerance at the expense of a slight increase of viscosity.

MD simulations were performed on this n-butyl ether-diisopropyl derivative (1-BEIPADIP-2-BOL) to construct viscosity profiles as a function of loading and compared to other $CO_2BOL$ derivatives. We found that the slope of the viscosity of 1-BEIPADIP-2-BOL (purple line) was different than that of the other $CO_2BOL$ derivatives, indicating that the previous derivatives were likely operating on similar principles while this new derivative may entail new phenomena that impact viscosity. The deviation was believed to be due to changes in speciation of the $CO_2$ captured in solution.

In testing however, it was observed that while previous formulations of $CO_2BOLs$ had an equilibrium that favored the Zwitterionic species (driving the high viscosity). 1-BEIPADIP-2-BOL however, appeared to break this rule as the CMD model based solely on zwitterion species strongly overestimates viscosity exhibiting the expected non-linear increase upon $CO_2$ loading. The failure of this approach was in the inability of the simplified continuum model to predict the acid base chemistry of the more complex liquid. More realistic simulations predict that the distribution of species in 1-BEIPADIP-2-BOL is 50:50 of the neutral acid, reducing the degree of iconicity of the solvent by 50% compared to 1-IPADM-2-BOL at a comparable level of $CO_2$ uptake.

The liquid-film mass transfer coefficients (k'g) for 1-BEIPADIP-2-BOL were calculated from the VLE and viscosity measurements in the custom PVT cell. The k'g value of $CO_2$ in 1-BEIPADIP-2-BOL were on the same order as aqueous solvents such as 5 M MEA, and water-lean solvents such as 1-IPADM-2-BOL and GE's GAP/TEG Pa under comparable loadings and driving forces. Further, when the k'g values as a function of $CO_2$ loading at 40° C. were compared, the values for 1-BEIPADIP-2-BOL overlay with those measured for 1-IPADM-2-BOL indicating comparable absorber performance and sizing. This result is surprising, a 98% reduction in viscosity is expected to result in at least some detectable increase in mass transfer.

With a 98% reduction in viscosity, but with comparable P* and kinetics, we can perform a qualitative prediction of performance of the 1-BEIPADIP-2-BOL compared to performance projections of 1-IPADM-2-BOL. Table 5 shows a comparison of the 1-BEIPADIP-2-BOL to the US Department of Energy's NETL Case 10 amine baseline and our previous projections of 1-IPADM-2-BOL at a realistic (but not optimal) 353 rich-solvent loading and a hypothetical 20 cP target viscosity. This data shows that shows that if 1-IPADM-2-BOL run in a realistic, yet un-optimal process limited to 353 cP, would be projected to have a 27% lower reboiler duty, and 2.1% higher net efficiency albeit at the expense of a higher (nearly double) CAPEX than the Case 10 baseline. Prior examples required that the solvent be run at a lower lean solvent loading to prevent the viscosity from increasing past 353 cP, which resulted in a higher reboiler temperature and reboiler duty, which translated to the higher cost/tonne ($63) than the Case 10 baseline ($60). Our prior prediction that if viscosity could be kept a theoretical minimum of 20 cP, the theoretical performance for 1-

1-IPADM-2-BOL would result in a 43% reduction in reboiler duty, with a 4.1% increase in net plant efficiency and a cost/tonne $CO_2$ of $39, which is below the DOE target of $40. 1-BEIPADIP-2-BOL has a rich solvent viscosity of 36 cP, which is close to the theoretical 20 cP target. 1-BEIPADIP-2-BOL therefore is a material that shows promise as a potentially efficient post-combustion solvent.

This and other new derivatives would be among the most efficient solvents for post-combustion $CO_2$ capture on the market. The system has a higher efficiency than $1^{st}$ and $2^{nd}$ generation aqueous amines, with potential to be refined and improved with continued research and development.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for capturing an acid gas from a stream containing said acid gas the method comprising the step of contacting the stream with a gas selective capture sorbent comprising a 1-BEIPADIP-2-BOL that reversibly binds an acid gas under a first set of conditions and releases said acid gas under a second set of conditions, whereby the acid gas binds to the gas selective capture sorbent to form a bound solvent.

2. The method of claim 1 further comprising the step of moving the bound solvent to another location and exposing said bound sorbent to a second set of conditions whereby the acid gas is released and the sorbent is regenerated.

3. The method of claim 1 wherein the sorbent is a liquid.

4. The method of claim 1 wherein the acid gas is selected from $CO_2$, $SO_2$, COS, $CS_2$, $H_2S$, and combinations thereof.

5. The method of claim 1 wherein the step of exposing said bound sorbent to a second set of conditions includes heating said sorbent to a temperature between from 100° C. to 130° C.

6. The method of claim 1 wherein the second set of conditions includes heating a bound sorbent in the presence of an antisolvent in the liquid phase to a temperature between from 70° C. to 100° C.

7. The method of claim 6 wherein the antisolvent is a non-volatile, chemically inert liquid with low polarity.

8. The method of claim 1, wherein the contacting under a first set of conditions forms a zwitterionic alkylcarbonate, and wherein the step of exposing said acid gas bound sorbent to a second set of conditions includes shifting polarity of the sorbent from zwitterionic alkylcarbonate form to an alkyl-carbonic acid form.

* * * * *